United States Patent Office 3,434,759
Patented Mar. 25, 1969

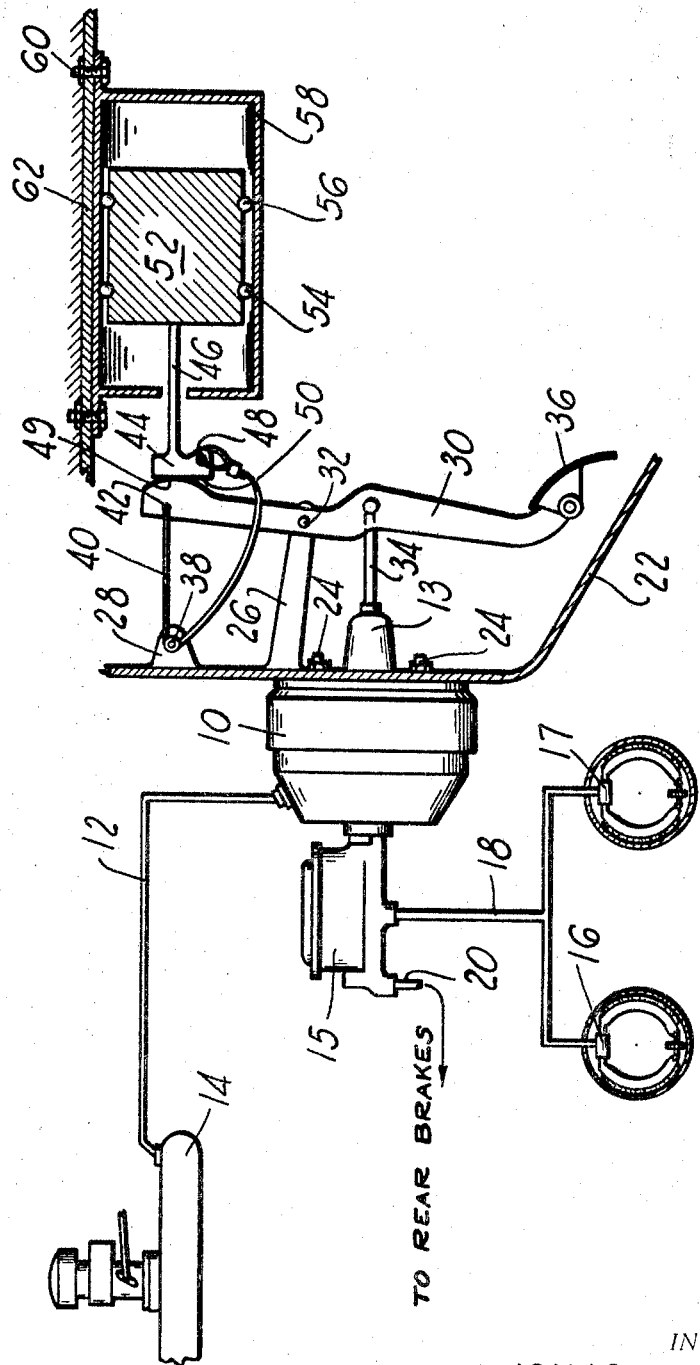

3,434,759
DECELERATION SENSITIVE REACTION FOR A FLUID PRESSURE SERVOMOTOR CONTROL MEANS
Thomas M. Julow, South Bend, Ind., assignor to The Bendix Corporation, a corporation of Delaware
Filed June 6, 1967, Ser. No. 643,960
Int. Cl. B60t 8/00, 17/00, 13/00
U.S. Cl. 303—24                                3 Claims

ABSTRACT OF THE DISCLOSURE

A fluid pressure servomotor control means having a deceleration sensitive mass operably connected therewith to create a reactive force on an operator-operated control for the fluid pressure servomotor regardless of whether the vehicle is being braked while traveling in a forward direction or a rearward direction.

SUMMARY

In fluid pressure operated servomotors, and more particularly with regard to such servomotors for actuating power brakes of automotive vehicles, it has become quite apparent that ways must be provided for maintaining a constant sense of feel for any deceleration value. Present day power brake servomotors provide a feel that is proportioned to brake fluid pressure. This is considered a disadvantage in view of varying brake torque characteristics due to variances in temperature, moisture, drum and shoe condition, etc. Thus, this invention provides for the actuation of a fluid pressure servomotor with little or no reaction forces being attendant to the initial operation and as soon as deceleration forces become apparent, a reaction force will be proportionally provided to the driver.

RELATED APPLICATIONS

Applicant now has pending before the United States Patent Office a patent application Ser. No. 615,790, filed Feb. 13, 1967, which is related to the same general problem as this application. However, this application is an improvement over the earlier filed patent application in that the deceleration sensitive mass is connected to the control means for the servomotor such that deceleration forces about the C.G. of the vehicle due to braking while traveling forward or braking while traveling in a rearward direction are impressed upon the control; whereas in the earlier system, deceleration forces stemming from braking in the forward direction only where adapted to provide a controllable reaction to the operator of the braking system.

DRAWING DESCRIPTION

The single figure shows a conventional power brake servomotor and braking system in schematic form with a deceleration sensitive reaction means mounted in a cross sectioned cylinder in accordance with the principles of this invention.

DETAILED DESCRIPTION

With regard to the structure shown, a power brake servomotor 10 is connected by a conduit 12 to an intake manifold 14 of an automobile engine to provide vacuum pressure in the servomotor 10. Atmospheric pressure is supplied internally of the servomotor via passages through a boot 13 to normally flow internally of a valve apparatus so that in the released attitude of the servomotor, as seen in the drawing, the vacuum suspends the movable walls (not shown) of the servomotor. The servomotor is adapted to control a master cylinder 15 of the type which provides, upon actuation, separate braking pressures for wheel cylinders 16 and 17 of the vehicle's front brakes via conduit 18 from the master cylinder to the wheel cylinders, and to similar braking motors of the vehicle's rear brakes via a conduit 20.

Internal details of the servomotor may be visualized in U.S. Patent No. 3,106,873, and, more particularly, in FIGURE 2 thereof showing the type of valve apparatus and movable wall internally of the servomotor that is in mind with regard to this application for controlling the master cylinder 15. The servomotor is connected to the firewall 22 of the vehicle by a plurality of bolts 24 such that the boot 13 extend into the passenger compartment of the vehicle to further insure the induction of clean air to the servomotor 10. The firewall 22 has arms 26 and 28 affixed to it in spaced relation above the connection of the servomotor 10 to the firewall. A brake pedal lever 30 is pivoted, as at 32, to the arm 26 and has a push rod 34 operatively connected to it below the arm 26 for operating the internal valve mechanism of the servomotor 10 upon the depression of the lever, as by the operator placing his foot on the treadle 36 and pushing inwardly.

The arm 28 mounts a pulley 38 about which a cable 40 is installed so that it has one end attached to the uppermost portion of the lever 30, as at 42, and the other end attached to an abutment surface 44 of a force transmitting rod 46, as at 48. As seen, the uppermost end of the lever 30 is provided with a surface 49 which normally rests against a face 50 of the end 44 of the rod 46.

The force transmitting rod 46 is affixed to a mass 52 supported by a plurality of bearings 54 and 56 at either end thereof within a cylinder 58 affixed as by the bolts 60 to the vehicle dash structure 62 extending rearwardly from the firewall 22, or some such similar platform projection from the firewall behind the lever 30.

OPERATION

Having fully described a preferred construction embodying the principles of my invention, its operation, while apparent to those skilled in the art to which the invention relates, may be described for the purposes of this disclosure to include the operator of a vehicle pivoting the lever 30 about its pivot 32 to move the push rod 34 inwardly and create a pressure differential across the movable walls of the servomotor 10. In addition, this movement of the lever 30 about the pivot 32 will, because of the contact of the surface 49 with face 50, move the mass 52 to the right, as viewed in the drawing. The bearings 54 and 56 at either end of the mass 52 within the cylinder 58 will reduce, if not eliminate the friction upon this movement of the mass, but in any event if there were friction forces involved they would be of so minute a character as to not to provide a significant reaction force above that to give control "feel" to the operator during this initial application of the lever 30 for the operation of a servomotor 10. After braking pressures have been developed by the desired pressure differential in a servomotor 10, deceleration forces about the center of gravity of the vehicle will take over and cause the mass to either move to the left or to the right depending upon whether the vehicle is traveling in a forward or rearward direction at the time of braking. This will create a force in the lever 30 opposite to that of the operator's force pivoting at about the pivot 32 whereby a "feel" is created for the operator to controllably sense the braking effort.

The protection sought in this patent is set forth in the following claims.

I claim:
1. A brake operating means comprising:
   a brake pedal lever pivoted to surrounding structure for actuation of a brake device; and
   a mass slidable in a fore and aft direction operably connected to said lever to resist actuation of said brake operating means with deceleration forces on said mass, said mass having a force transmitting rod with an abutment surface engaging a surface on said pedal lever and a cable passing around a pulley on said surrounding structure having one end connected to said rod and the other end connected to said lever whereby said mass can push said lever and pull said lever in a manner that forward and rearward deceleration forces provide reaction forces.

2. A brake operating means according to claim 1 wherein said mass is supported by bearing means in a cylinder affixed to said surrounding structure.

3. A brake operating means comprising:

a brake pedal lever pivoted to surrounding structure for actuation of a brake device, wherein said pedal lever is operatively connected to a fluid pressure servomotor on one side of the lever's pivot connection with surrounding structure; and a mass slidable in a fore and aft direction having an operative connection of said mass with said lever on the other side of said pivot connection to resist actuation of said brake operating means with deceleration forces on said mass whether they be forward deceleration forces or rearward deceleration forces.

References Cited

UNITED STATES PATENTS

| 2,079,409 | 5/1937 | Hunt | 303—24 XR |
| 2,181,161 | 11/1939 | Wolf | 303—24 XR |
| 3,008,771 | 11/1961 | Moyer | 137—45 XR |

FOREIGN PATENTS 201,493  9/1907  Germany.

VERGUS S. MIDDLETON, *Primary Examiner.*

J. J. McLAUGHLIN, JR., *Assistant Examiner.*

U.S. Cl. X.R.

60—54.5; 74—107; 303—1, 6